United States Patent
Ito et al.

(10) Patent No.: US 6,304,527 B1
(45) Date of Patent: Oct. 16, 2001

(54) NEAR-FIELD OPTICAL HEAD AND MANUFACTURING METHOD THEREOF AND OPTICAL RECORDING/READOUT SYSTEM USING NEAR-FIELD OPTICAL HEAD

(75) Inventors: Kenchi Ito, Kokubunji; Sumio Hosaka, Nishitama-gun; Masaru Muranishi, Niihari-gun; Kimio Nakamura, Tokorozawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/267,597

(22) Filed: Mar. 15, 1999

(30) Foreign Application Priority Data

Mar. 17, 1998 (JP) .................................................. 10-066489

(51) Int. Cl.⁷ ....................................................... G11B 7/12
(52) U.S. Cl. .................................... 369/44.23; 369/44.12; 369/112.01; 369/126
(58) Field of Search .............................. 369/44.23, 44.12, 369/44.14, 112, 109, 126, 122, 118, 112.01, 112.05, 112.08, 112.09, 112.23, 112.27

(56) References Cited

U.S. PATENT DOCUMENTS 5,946,284 * 8/1999 Chung et al. .......................... 369/126
5,959,957 * 9/1999 Ikeda et al. ....................... 369/126 X
5,986,995 * 11/1999 He et al. ........................ 369/44.23 X

FOREIGN PATENT DOCUMENTS 3-171434   7/1991   (JP) .

OTHER PUBLICATIONS

Applied Physics Letters, vol. 61, No. 2, Jul. 13, 1992, "Near-field magneto-optics and high density data storage", E. Betzig et al, pp. 142–144.

Applied Physics Letters, vol. 68, No. 25, Jun. 17, 1996, "Multipurpose sensor tips for scanning near-field microscopy", C. Mihalcea et al, pp. 3531–3533.

Applied Physics Letters, vol. 68, No. 19, May 6, 1996, "Tailoring a high-transmission fiber probe for photon scanning tunneling microscope", T. Saiki et al, pp. 2612–2614.

Applied Physics Letters, vol. 71, No. 13, Sep. 29, 1997, "Highly efficient excitation of optical near-field on an apertured fiber probe with an asymmetric structure", T. Yatsui et al, pp. 1756–1758.

* cited by examiner

Primary Examiner—Muhammad Edun
(74) Attorney, Agent, or Firm—Mattingly, Stanger & Malur, P.C.

(57) ABSTRACT

A pad for controlling the state of contact or flying of a slider with or to an information-recording medium and a probe for exciting near-field light having a small spot size are mounted on the slider and the pad is near to the probe. Semiconductor laser light focused by an objective lens is converted into near-field light having a small spot size near the top of the probe for exciting near-field light. The slider travels at a height of several tens nm to a recording medium substrate and information is recorded or read out on or from the information-recording medium formed on the recording medium substrate.

24 Claims, 14 Drawing Sheets

CENTER AXIS

NEAR-FIELD OPTICAL HEAD AND MANUFACTURING METHOD THEREOF AND OPTICAL RECORDING/READOUT SYSTEM USING NEAR-FIELD OPTICAL HEAD

BACKGROUND OF THE INVENTION

The present invention relates to a near-field optical head, a manufacturing method of the near-field optical head, and an optical recording/readout system using the near-field optical head.

Recently, an optical recording using near-field light has received attention as a method for making an optical disc device extremely dense. For example, the following experimental results were reported in Applied Physics Letters, Vol. 61, No. 2, pp. 142–144, 1992: a probe was made by shaving the top of an optical fiber into a cone and by coating it with metal except for several tens nm of the top and was mounted on a precision actuator using a piezo device, and a recording mark of 60 nm in diameter was recorded or read out on or from a platinum/cobalt multi-layer by controlling the position of the probe. In this case, a shear-force method applying an atomic force to the control of a gap between the probe is used and a recording medium and an areal density reached 45 gigabit/in$^2$, which is about 20 times the present areal density. Further, in Japanese Unexamined Patent Publication No. 3-171434, a method is disclosed wherein near-field light is excited by focusing light on a small pinhole by a lens and a gap between the small pinhole and a recording medium is controlled with the use of an atomic force generated between a cantilever having the small pinhole at the top thereof and the recording medium, and another method is disclosed wherein a slider which receives a light source, a lens and a small pinhole is arranged on a medium and is flown by air to control a gap between the small pinhole and the recording medium.

SUMMARY OF THE INVENTION

In an optical information-recording/readout system, in order to increase an information transfer rate, it is necessary to increase a relative speed of a recording medium to an optical head for recording/reading-out information.

However, in the above-mentioned first conventional example using the shear-force method applying the atomic force to the control of the gap between the probe and the recording medium, the gap between the recording medium and the optical head, that is, the fiber probe is required to be controlled with a scanning force microscopy with extremely high accuracy and hence there exists a problem in that if an information-recording disc is rotated at high speeds, the gap between a substrate having a high frequency produced by a radial positioning error of the disc and that the probe can not be controlled with high accuracy and therefore an information data transfer rate can not be increased.

Further, in the conventional example using the cantilever, a change in capacitance or a laser interferometric measurement is used as a method for detecting a displacement of the cantilever and hence there exists a problem in that a large-scale optical system or a capacitance measurement system other than an illumination optical system for exciting near-field light is required and that the system is made larger and more complex. Furthermore, the following optical lever method was reported in Applied Physics Letters, Vol. 68, No. 25, pp. 3531–3533, 1996: the displacement of a cantilever was converted into the movement of a light point on a linear photodiode by irradiating the cantilever with laser light at the back thereof to detect the displacement of the cantilever. However, also in this case, there exits a problem in that a large-scale optical system other than an illumination optical system for exciting near-field light is required and that the system is made larger and more complex.

Furthermore, in the conventional example having the slider which receives the light source, the lens and the small pinhole on the medium, many optical parts such as light source, lens and the like are mounted on the slider and hence the mass of the slider is increased to deteriorate the following of an up-down oscillation caused by the rotation of the recording medium by the slider, which makes it impossible to constitute the system. Still further, in Japanese Unexamined Patent Publication No. 3-171434, a method for mounting and forming the pinhole, the laser light, and the lens is not disclosed in the concrete.

An object of the present invention is to provide a near-field optical head capable of increasing a relative speed of a recording medium to the optical head for recording/reading-out information so as to increase an information data transfer rate of an ultra-high density optical recording/readout system using a probe for exciting near-field light. Further, another object of the present invention is provide a near-field optical head which does not need an additional unit for detecting a gap between the recording medium and the optical head and hence is reduced in size and weight and constituted simply. Furthermore, still another object of the present invention is to provide an optical recording/readout system using this kind of near-field optical head.

To solve the above-mentioned problems, the present invention adopts the following means.

A cylindrical or prismatical pad for controlling the state of contact or flying of an optically transparent slider with or to an information-recording medium and a probe for exciting near-field light having a small spot size are mounted on the surface of the slider opposite to the information-recording medium such that the pad is near to the probe, wherein the slider moves relatively to the information-recording medium while keeping contact with or a nearly constant gap to the information-recording medium, and further the height of the probe is nearly equal to and smaller than the height of the pad from the surface of the slider opposite to the information-recording medium. Accordingly, the near-field optical head is integrally formed with the slider to constitute a near-field optical head which is reduced in size and weight and is simply constituted and has the same performance as a head used in a conventional hard disc drive. Further, since the slider is reduced in size and weight, it is possible to increase a relative speed of the recording medium to the optical head for recording/reading-out information.

Further, in the near-field optical head described above, the near-field optical head having a small spot size can be excited by forming an optically opaque film, for example a metallic film, on the pad and the probe, and further by making at the top the probe a small aperture in which the constituent of the probe is exposed and the surface of the exposed constituent of the probe and in which the surface of the metallic thin film are substantially on the same plane.

Still further, in the near-field optical head described above, the probe can be shaped into an arbitrary pyramidal structure or the small aperture can be made in the top of the probe by arranging the pad in such a way to surround the probe and by dividing the pad into at least a plurality of parts and by arranging the divided parts in such a way that the probe can be seen through a gap between the divided parts when viewed from the side of the pad and by etching the probe by irradiating the probe with a particle beam from the side of the probe. Furthermore, an optical recording readout system of ultra-high density can be constituted with the use of the near-field optical head, a light source for supplying illumination light to the near-field optical head, an optical recording medium, a detection system for detecting a modulated signal of the near-field light excited by the near-field optical head by the recording medium.

DESCRIPTION OF THE PREFERRED EMBODIMENTS

Preferred embodiments of the present invention will be described hereinafter with reference to the attached drawings.

Figure 1A:
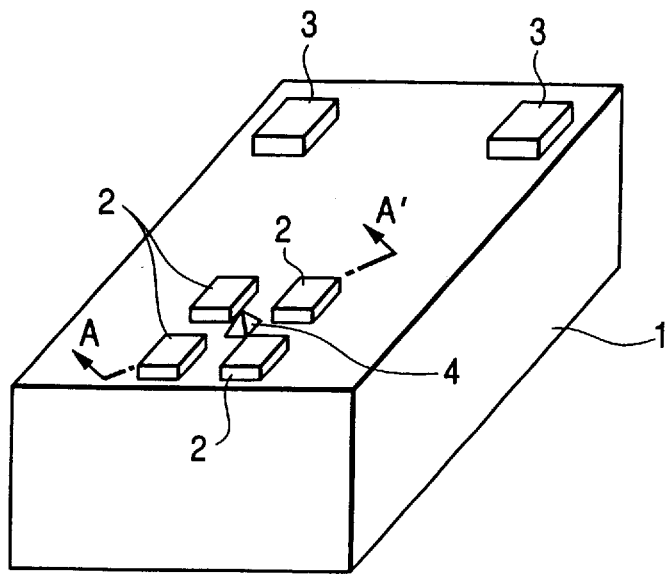
FIG. 1A is a perspective view showing a first preferred embodiment of a near-field optical head according to the present invention.
Figure 1B:
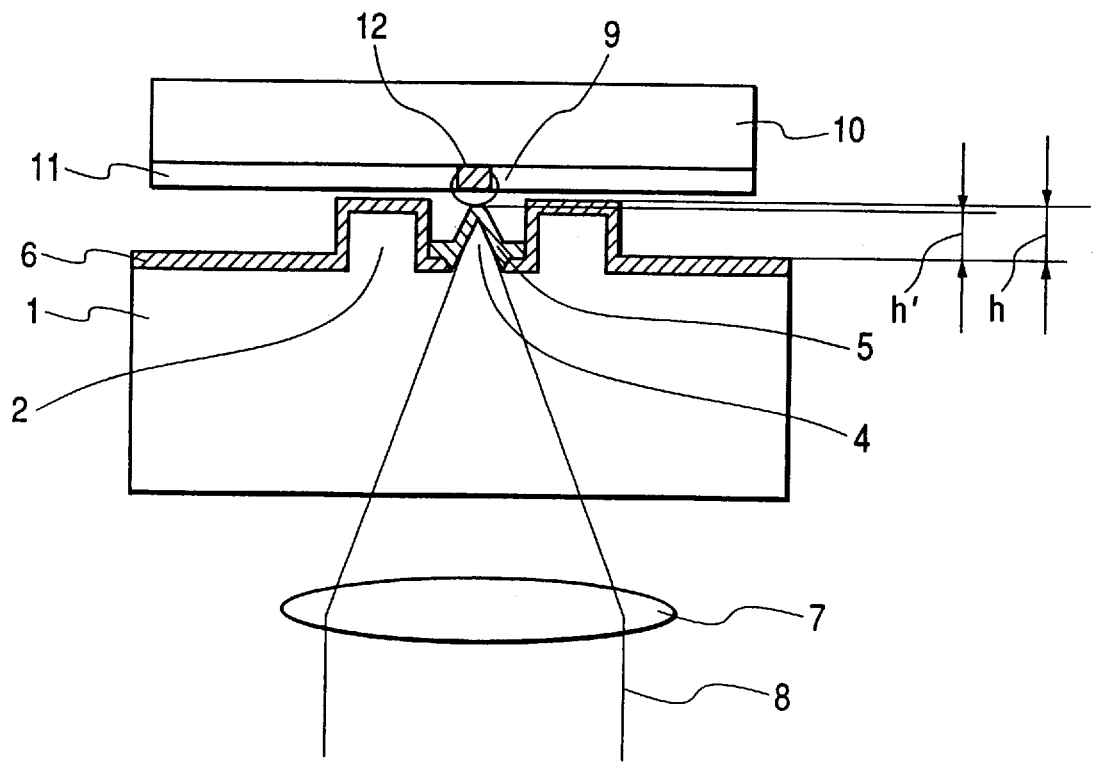
FIG. 1B is a cross-sectional view taken on a line A–A' in FIG. 1A.
Figure 14A:
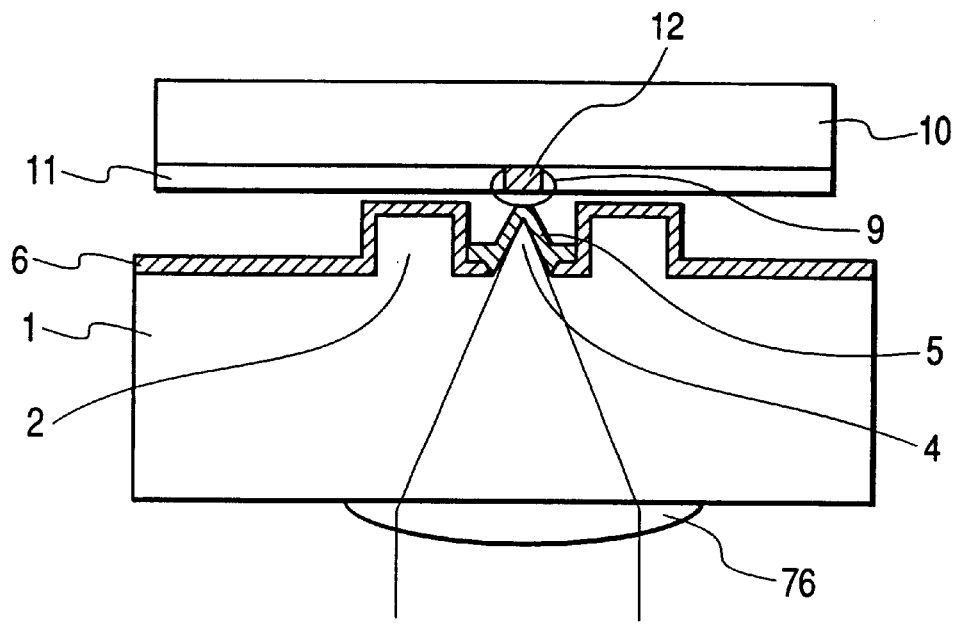
FIG. 14A shows a fourth preferred embodiment of a near-field optical head according to the present invention.
Figure 14B:
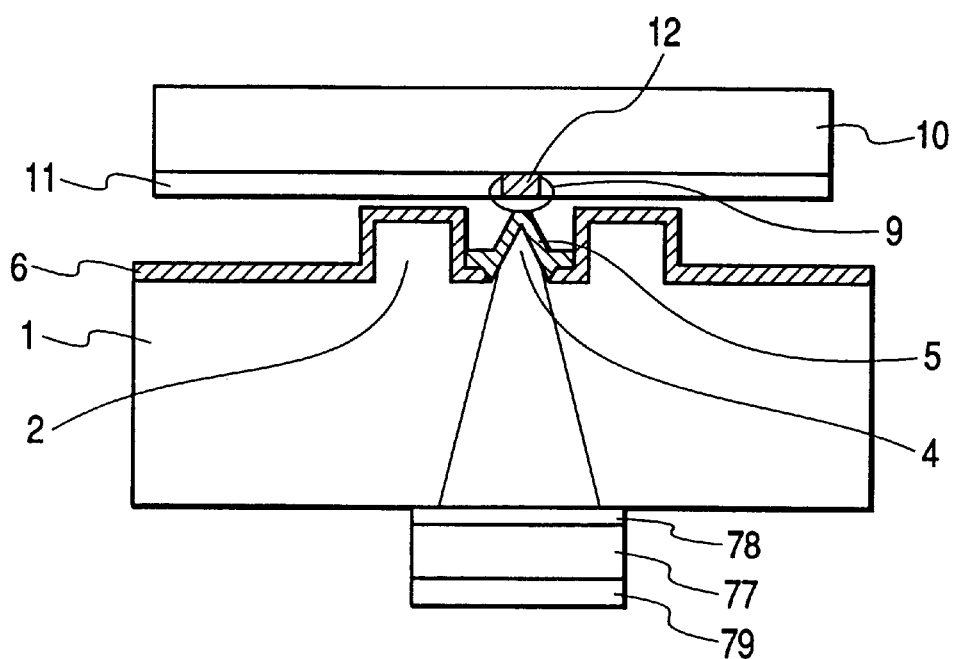
FIG. 14B shows a fifth preferred embodiment of a near-field optical head according to the present invention.
Figure 15:
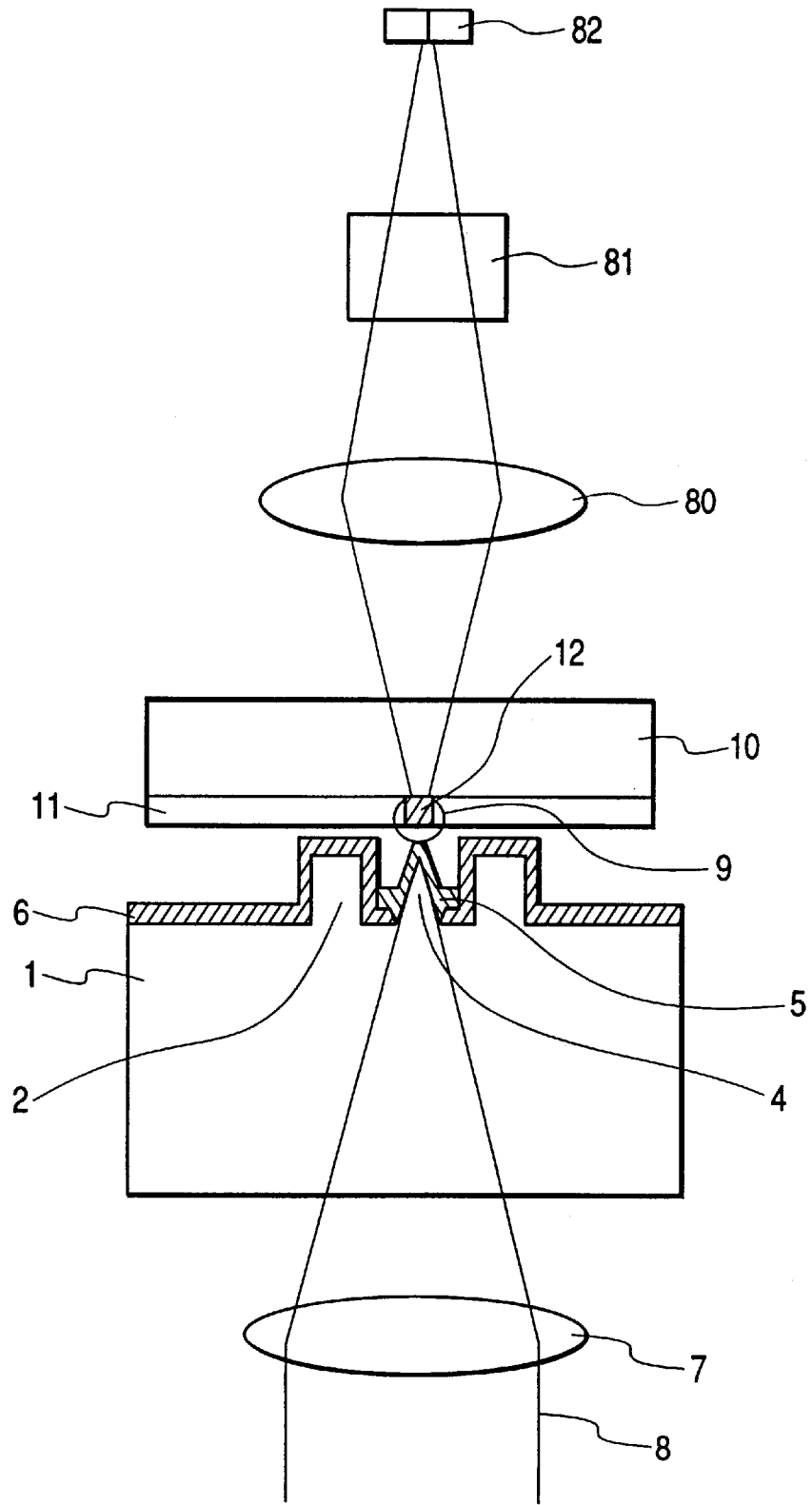
FIG. 15 shows a sixth preferred embodiment of a near-field optical head according to the present invention.

FIG. 1 is a preferred embodiment of the present invention. FIG. 1A is a perspective view of a near-field optical head according to the present invention. FIG. 1B is a cross-sectional view taken on a line A–A' in FIG. 1A. In this respect, to make it easier to understand a relationship between the near-field optical head and an information-recording medium 11, the information-recording medium 11 and a support substrate 10 thereof are shown together in FIG. 1B. Further, the information-recording medium 11 and the support substrate 10 thereof are shown together also in FIG. 7B, FIG. 8B. FIG. 14A, FIG. 14B, and FIG. 15.

In FIG. 1A, a numeral 1 designates a slider made of optically transparent substance. Since the case in which a semiconductor laser having a wavelength of 780 nm is a light source is described in the present preferred embodiment, quartz is selected as the material of the slider, but it is not intended to limit the material of the slider to the quartz. Numerals 2, 3 designate pads for controlling the state of flying to the information-recording medium 11 of the slider 1. In the present preferred embodiment, four-divided pads 2 are provided at the center of one end portion of a surface of the slider 1 opposite to the information-recording medium 11 and pads 3 are provided on both sides of the other end portion thereof. A pyramid-shaped probe 4 shaped for exciting near-field light is provided at the center of the four-divided pads 2. The probe 4, as shown in FIG. 1B, is coated with a metallic thin film 5 having a thickness of several tens nm. Further, an anti-wearing thin film, for example a carbon film 6, of about 10 nm thick is formed on the surface of the slider 1 opposite to the information-recording medium 11 except for the probe 4.

In FIG. 1B, a numeral 7 designates an objective lens for focusing semiconductor laser light 8 on the probe 4 for exciting near-field light. The focused semiconductor laser light 8 is converted into near-field light 9 having a small spot size near the top of the probe 4 for exciting near-field light. The slider 1 travels at a flying height of several tens nm to the recording medium 11 and, with the use of the above-mentioned near-field light 9, information 12 is recorded on or read out from the recording medium 11 formed on the support substrate 10.

Here, the height h' of the probe 4 is required to be surely smaller than the height h of the pad 2. In this respect, there are two heights for the height of the probe 4: one height is the height of a pyramid made by shaving a part of the slider 1 and including the metallic thin film 5 formed thereon, as shown in FIG. 2A to FIG. 2C, or FIG. 3 and the other height is the height of only a frustum made by cutting off the top of the pyramid including the metallic thin film 5 formed thereon, as shown in FIG. 4A to FIG. 4C, or FIG. 5. In the description of the probe 4 in the preferred embodiments described below, mention will not be made of the difference in the heights, unless it is necessary.

As shown in FIG. 1B, the slider 1 travels at a flying height of only several tens nm to the surface of the recording medium 11. The top surface of the pad 2 is a sliding surface of the slider 1 to the surface of the recording medium 11. Therefore, when the slider 1 is put into contact with the recording medium substrate 10 during a recording/readout operation by the present head, the top surface of the pad 2 is put into contact with the recording medium substrate 10. If the height h' of the probe 4 is larger than the height h of the pad 2, the top of the probe 4 is put into contact with the recording medium substrate 10 to wear the probe 4. To prevent this problem, the h' is required to be surely smaller than the h. It is necessary not only to make the height h' surely smaller than the height h, but also to make the difference between the height h' and the height h extremely small. It is known that the intensity of the near-field light 9 does not substantially change when a distance from the top of the probe 4 is nearly the size of the top of the probe 4 but it decreases rapidly when the distance from the top of the probe 4 is greater than the size of the top of the probe 4. The size of the top of the probe 4 ranges from several tens nm to 100 nm, and if the gap between the probe 4 and the recording medium 11 is greater than that, the intensity of the near-field light 9 becomes extremely small on the recording medium 11. Since the slider 1 travels at a flying height of several tens nm to the surface of the recording medium 11, to keep the gap between the probe 4 and the recording medium 11 at the size of the top of the probe 4, that is, from several tens nm to not more than 100 nm, it is necessary to make the height h' nearly equal to the height h and to keep the gap between the top of the probe 4 and the surface of the recording medium 11 at about several tens nm when the slider 1 travels. To this end, it is necessary to control the difference between the height h' and the height h in a nm order. This is an important point in manufacturing the present near-field optical head and a manufacturing method therefor will be described later in detail.

If the near-field optical head is employed in which the probe for exciting near-field light is integrated with the slider as described above, it is possible to constitute a near-field optical head which is reduced in size and weight and is constituted simply and has the same performance as a conventional hard disc drive. Further, since the slider is made compact and lightweight, the relative speed of the recording medium to the optical head for recording/reading-out information can be increased, which can increase an information data transfer rate.

Next, the probe for exciting near-field light employed in the present preferred embodiments will be described in detail with the use of FIG. 2 to FIG. 6.

Figure 2A:
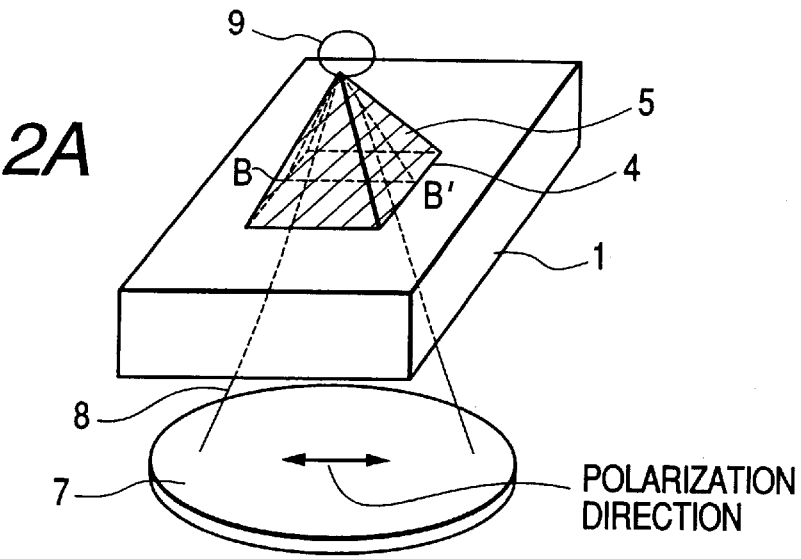
FIG. 2A and FIG. 2B are perspective views showing examples of probes used in a near-field optical head.
Figure 2B:
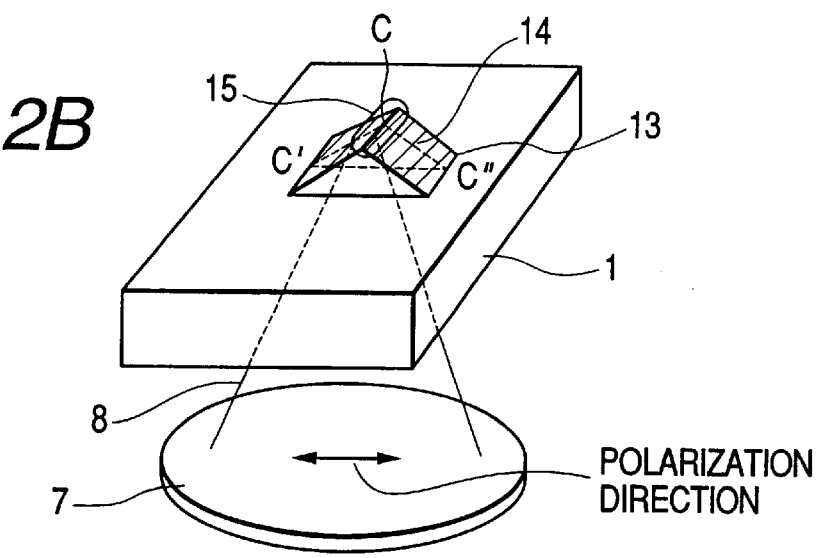
Figure 2C:
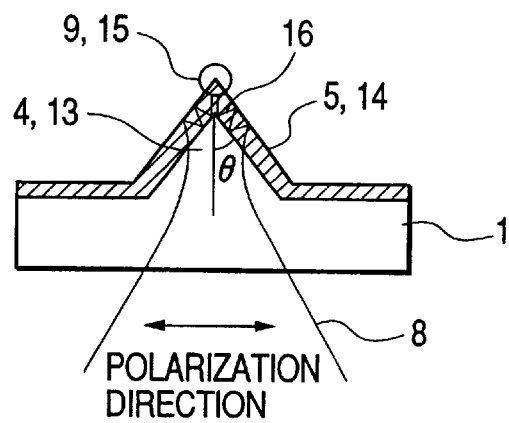
FIG. 2C is a cross-sectional view thereof.

FIG. 2A is an enlarged view of the probe shaped like a pyramid used in FIG. 1. FIG. 2B is an enlarged view of the probe shaped like a triangular prism. Further, FIG. 2C is a cross-sectional view taken on a plane which passes the summit of the pyramid and the center points B, B' of the two sides of a bottom face in FIG. 2A (in parallel to the polarization direction of the semiconductor laser light 8), and a plane which passes the center points C, C', C" of the three sides of the triangular prism in FIG. 2B (in parallel to the polarization direction of the semiconductor laser light 8).

In FIG. 2A, if the probe 4 is made of quartz, for example, the metallic thin film 5 formed on the probe 4 can be selected from various kinds of metals. However, if there is a specific relation between the kind of metal and the half cone angle θ of the summit of the pyramid shown in FIG. 2C, high efficiency can be obtained. The semiconductor laser light 8 is focused near the top of the probe 4 and the wavefront thereof can be regarded as a plane. In this case, if a combination of the above-mentioned half cone angle θ and the kind of metal is suitable, a surface plasma wave 16 is excited in the metallic thin film 5. The surface plasma wave 16 can propagate even in a thin metallic film of several tens nm thick and hence the semiconductor laser light converted into the surface plasma wave 16 propagates effectively to the top of the probe 4 to excite the near-field light 9 with high efficiency. For example, when quartz is used as the probe, the half cone angle θ is about 42 degrees if aluminum is used as metal, about 42 degrees if gold is used, and about 44 degrees if silver is used. In FIG. 2B, since the probe 13 is shaped like a triangular prism, light focused near the top of the probe is focused only in a plane parallel to the cross section C, C', C". Therefore, linear near-field light 15 is excited in the case of FIG. 2B, which is different from the case in FIG. 2A. Even in the shape shown in FIG. 2B, if the relation between the half cone angle θ of the summit and the kind of metal 14 is set at the same level as the above-mentioned relation, high efficiency can be obtained.

Although the sizes of the probes 4 and 13 are not limited to a specific size, taking into account that it needs to be easily manufactured and that, for example, if laser light having a wavelength of 780 nm is focused by an objective lens with a numerical aperture of 0.6, the focusing spot thereof is about 1.3 $\mu$m, and that all the laser light is focused on the probe effectively, it is preferable that one side of the square bottom face of the pyramid is 3 to 4 $\mu$m long in the case of FIG. 2A. Further, it is preferable that two sides parallel to the cross section C, C', C" are about 3 to 4 $\mu$m long in the case of FIG. 2B, but two sides perpendicular to the cross section C, C', C" can assume various values according to the spot size of the near-field light 15.

Figure 3:
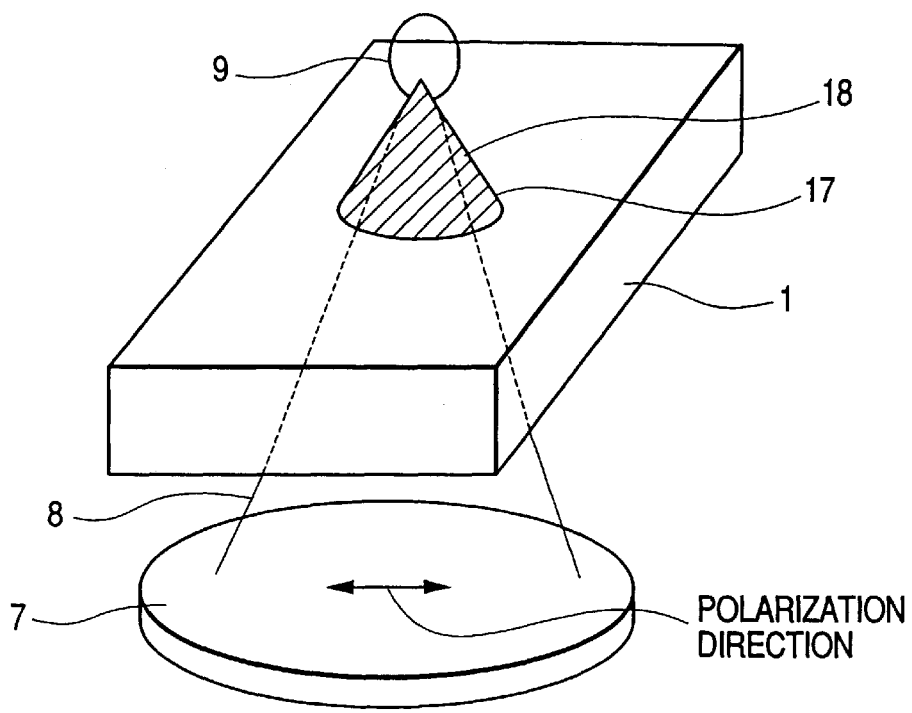
FIG. 3 is a perspective view showing another example of a probe used in a near-field optical head.

FIG. 3 shows a probe 17 shaped like a cone. Also in this case, if the relation between the half cone angle θ of the summit of the cone and the kind of metallic thin film 18 formed on the probe 17 satisfies the specific conditions described above, the near-field light 10 can be excited with high efficiency.

Figure 4A:
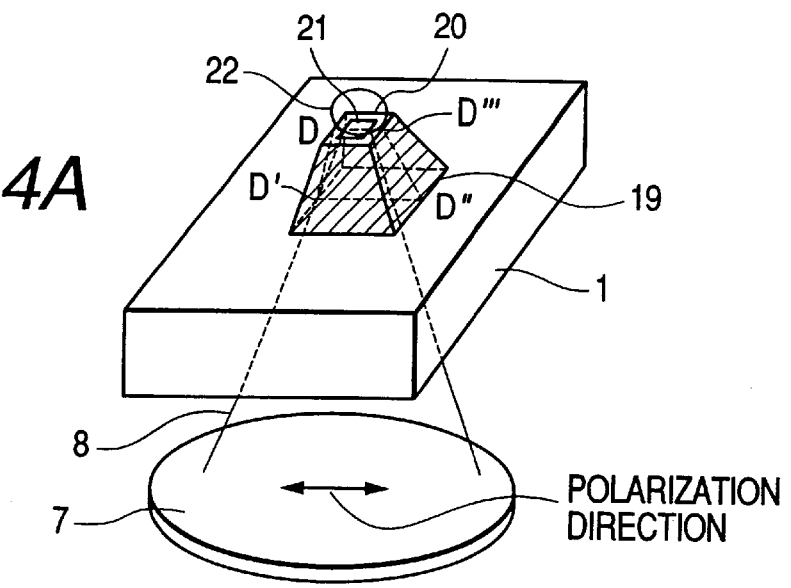
FIG. 4A and FIG. 4B are perspective views showing the other examples of probes used in a near-field optical head.
Figure 4B:
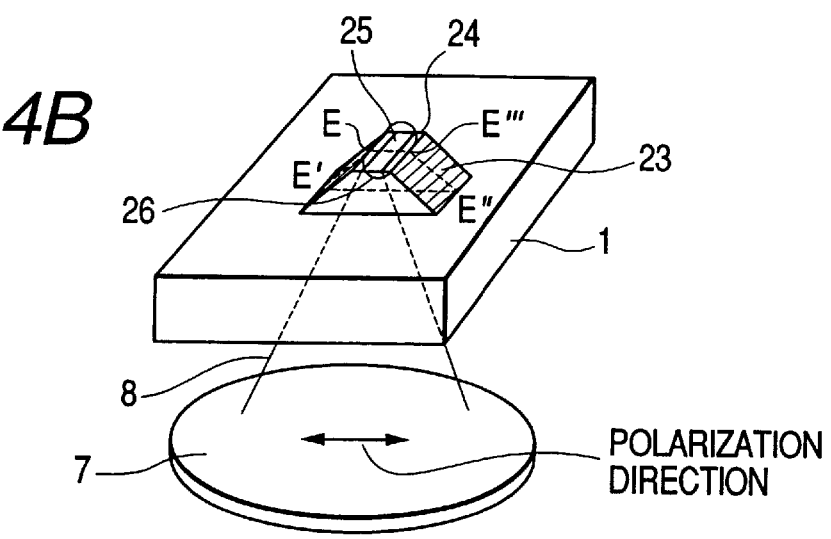
Figure 4C:
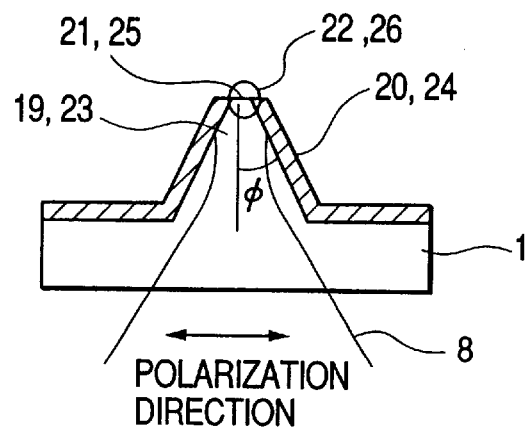
FIG. 4C is a cross-sectional view taken on a plane EE'E"E'" in FIG. 4B.

FIG. 4 is another probe for exciting near-field light. FIG. 4A shows the probe in which the top of the square-pyramid-shaped probe 4 shown in FIG. 2A is cut away. FIG. 4B shows the probe in which the top of the triangular-prism-shaped probe 13 shown in FIG. 2B is cut away. FIG. 4C shows a cross-sectional view taken on a plane which passes four points of center points D and D''' of the two sides of the square top face of a square frustum and the center points D', D" of the two sides of the square bottom face thereof in FIG. 4A (in parallel to the polarization direction of the semiconductor laser light 8), and a plane which passes four points of center points E and E''' of the two sides of the square top face of a probe and the midpoints E', E" of the two sides of the square bottom face thereof in FIG. 4B (in parallel to the polarization direction of the semiconductor laser light 8).

In the probe 19 shown in FIG. 4A, the top of the pyramid is cut away and an aperture 21 is made. In the probe having the aperture, an optically opaque thin film 20, for example, a metallic thin film formed on the surface of the probe is used as a light-shield film for the semiconductor laser light 8 focused by the objective lens 7. In this case, the size of near-field light 22 used for recording/readout is the sum of the magnitude d of the aperture 21 and the skin depth of the light to the metallic thin film. If a manufacturing method described below in detail is used, the magnitude of the aperture can be made about 20 nm at the minimum. Various kinds of metals such as gold, silver, platinum, aluminum, chromium can be used as the light-shield metal. The skin depth of light having a wavelength of 780 nm to these metals ranges typically from 10 to 20 nm, and hence the near-field light spot of about 40 nm can be made at the minimum. In FIG. 4B, since the probe 23 is shaped like a triangular prism and the aperture 25 is shaped like a narrow rectangle, linear near-field light 26 is excited. In this case, the size of near-field light in the cross section EE'E"E''' is the same as that in FIG. 4A, but the size in the direction perpendicular to the cross section EE'E"E''' can be freely selected by selecting the length of the longer side of the rectangle.

If the value of the half cone angle φ of the probe shown in FIG. 4C is made about 30 to 60 degrees, the probe having a high throughput can be obtained. If the half cone angle φ is too small, the length of the tapered portion of the probe is made larger. In general, light propagating in the space can not propagate in the region smaller than the wavelength of the light and hence, in the preferred embodiment shown in FIG. 4C, most of the optical power is absorbed by the metallic thin films 20 to 24 to reduce the throughput thereof. On the other hand, if the half cone angle φ is too large, most of the light is reflected by the probe. Accordingly, it is preferable that the half cone angle φ is set at a suitable value in the range described above so as to prevent the leakage of light to the metallic thin film and the reflection of light.

Although the sizes of the probes 19 and 23 are not limited to a specific size, taking into account that it needs to be easily manufactured and that if laser light having a wavelength of 780 nm is focused by an objective lens with a numerical aperture of 0.6, the focusing spot thereof is about 1.3 μm and that all laser light is effectively focused on the probe, for example in the case of FIG. 4A, it is preferable that one side of the square bottom face of the pyramid is 3 to 4 μm long. Further, although it is preferable that the sides parallel to the cross section EE'E"E'" are about 3 to 4 μm long in the case of FIG. 4B, two sides perpendicular to the cross section EE'E"E'" can assume various values according to the spot size of the near-field light 26.

Figure 5:
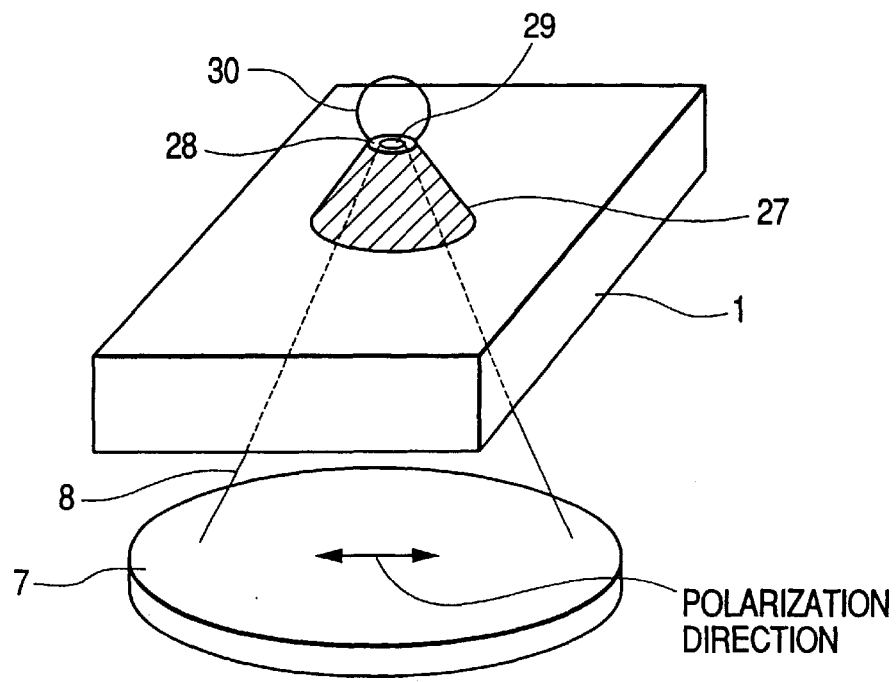
FIG. 5 is a perspective view showing another example of a probe used in a near-field optical head.

In FIG. 5, a probe 27 is shaped like a cone and a portion near the summit thereof is cut away and a circular aperture 29 is made. Also in this case, the size of the near-field light 30 is the sum of the magnitude of the aperture 29 and the skin depth of the light to a light-shield film 28 and can be made about 40 nm at the minimum. Further, if the value of the half cone angle φ of the cone is made about 30 to 60 degrees, as is the case with the above-mentioned case in FIG. 4C, the probe having a high throughput can be obtained.

In the cases of the probes 19, 23, and 27 having the aperture, researches in improving the throughput have been conducted with respect to the probe made by etching an optical fiber chemically. For example, the following results are described in Applied Physics Letters, Vol. 68, No. 19, pp. 2612–2614, 1996: the leakage of light to the metallic thin film 32 was prevented and the reflection of the light by the probe 31 was prevented, as shown in FIG. 6B, by changing the cone angle of the probe 31 in two steps, that is, by making the cone angle at the root of the probe smaller and the cone angle of the top thereof larger, so that the probe having a higher throughput could be obtained. Also in the present invention, according to a manufacturing method described below, the probe having the high throughput as shown in FIG. 6B can be obtained easily. Further, the following results are described in Applied Physics Letters, Vol. 71, No. 13, pp. 1756–1758, 1997: a probe having a high throughput could be obtained, as shown in FIG. 6C, by making the shape of the probe 35 unsymmetrical with respect to the center line of the probe to excite a surface plasma wave. Also in the present invention, according to a manufacturing method described below, the probe having the high throughput as shown in FIG. 6C can be easily obtained.

Figure 6A:
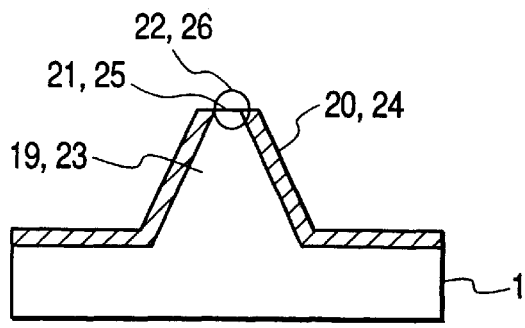
FIG. 6 is a cross-sectional view showing a semiconductor laser probe used in the present invention.
Figure 6B:
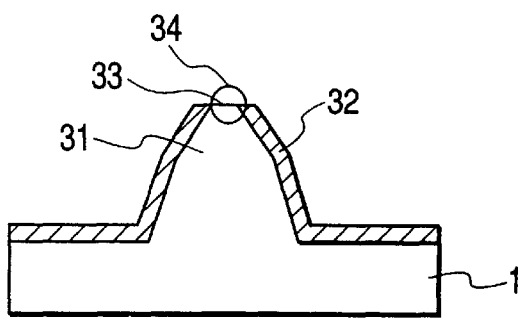
Figure 6C:
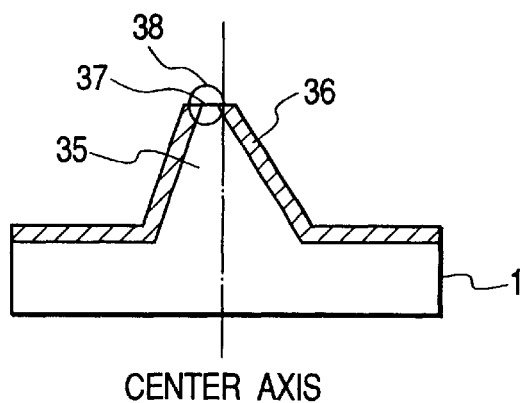
Figure 7A:
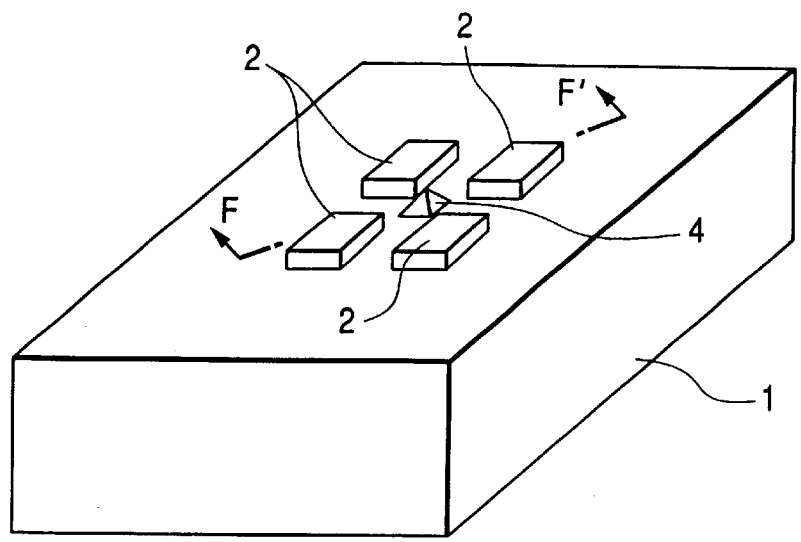
FIG. 7A is a perspective view showing a second preferred embodiment of the present invention using a contact type slider.
Figure 7B:
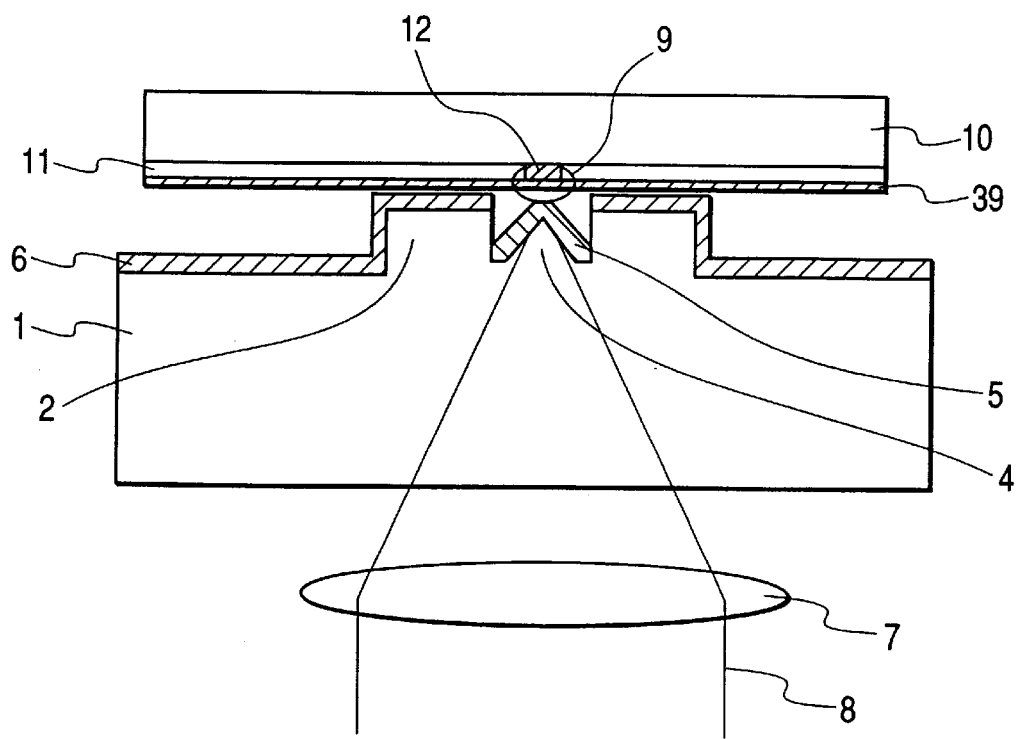
FIG. 7B is a cross-sectional view taken on a line F–F' in FIG. 7A.

FIG. 7 is the second preferred embodiment according to the present invention to which a contact type slider is applied. FIG. 7A is a perspective view of a near-field optical head of the present preferred embodiment. FIG. 7B is a cross-sectional view taken on a line F–F' in FIG. 7A. In FIG. 7A, on a slider 1 made of optically transparent substance, pads 2 are provided for controlling the state of contact of the slider 1 and an information-recording medium. Although three pads are provided on the bottom face of the slider 1 in the preferred embodiment shown in FIG. 1, four-divided pads 2 are provided in the present preferred embodiment. A pyramid-shaped probe 4 for exciting near-field light is provided at the center of the pads 2. The probe 4 is coated with a metallic thin film 5 having a thickness of several tens nm as shown in FIG. 7B. Further, an anti-wearing thin film 6, for example a carbon film, having a thickness of about ten nm is formed on the pads 2 and on the surface of the slider 1 opposite to the recording medium 11. Although an example is shown in FIG. 7B in which the material of the metallic thin film 5 is different from that of the anti-wearing thin film 6, the bottom face of the slider 1 and the surface of the probe 4 can be coated with the material, for example a chromium film, which can satisfy both the wear resistance and the exciting ability of the surface plasma wave in the case of the probe with no aperture described with reference to FIG. 2 and FIG. 3, or both the wear resistance and the light-shield ability in the case of the probe with an aperture described with reference to FIG. 4 to FIG. 6. This makes a manufacturing process easier. An anti-wearing carbon thin film 39 having a thickness of several nm is formed on the surface of the information-recording medium 11 and further polymeric lubricant is applied thereto in a thickness of several nm. The carbon thin film 39 and the lubricant improve the wear resistance of the information-recording medium 11. The slider 1 travels in contact with the recording medium substrate 10 and information 12 is recorded and read out, by the above mentioned near-field light 9, on and from the information-recording medium 11 formed on the recording medium substrate 10.

Figure 8A:
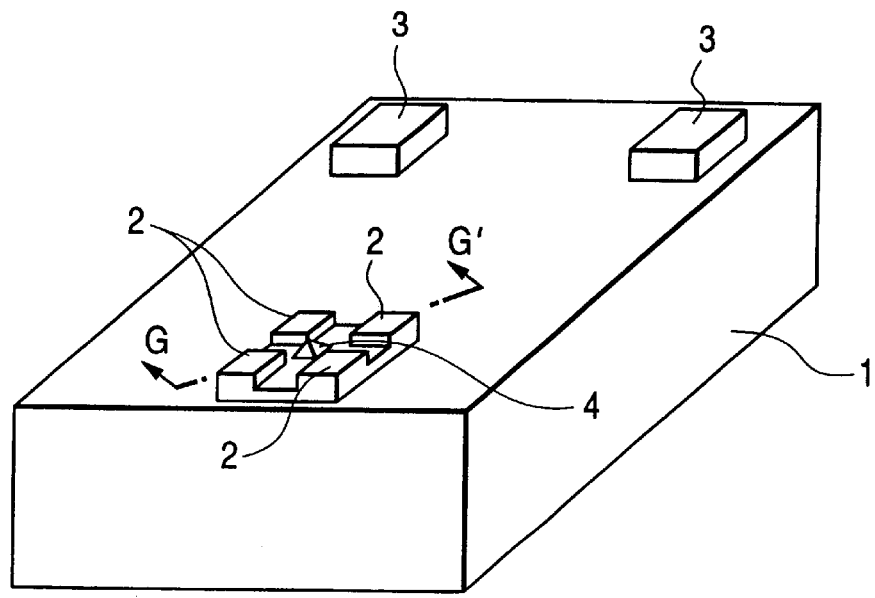
FIG. 8A is a perspective view showing a third preferred embodiment of the present invention.
Figure 8B:
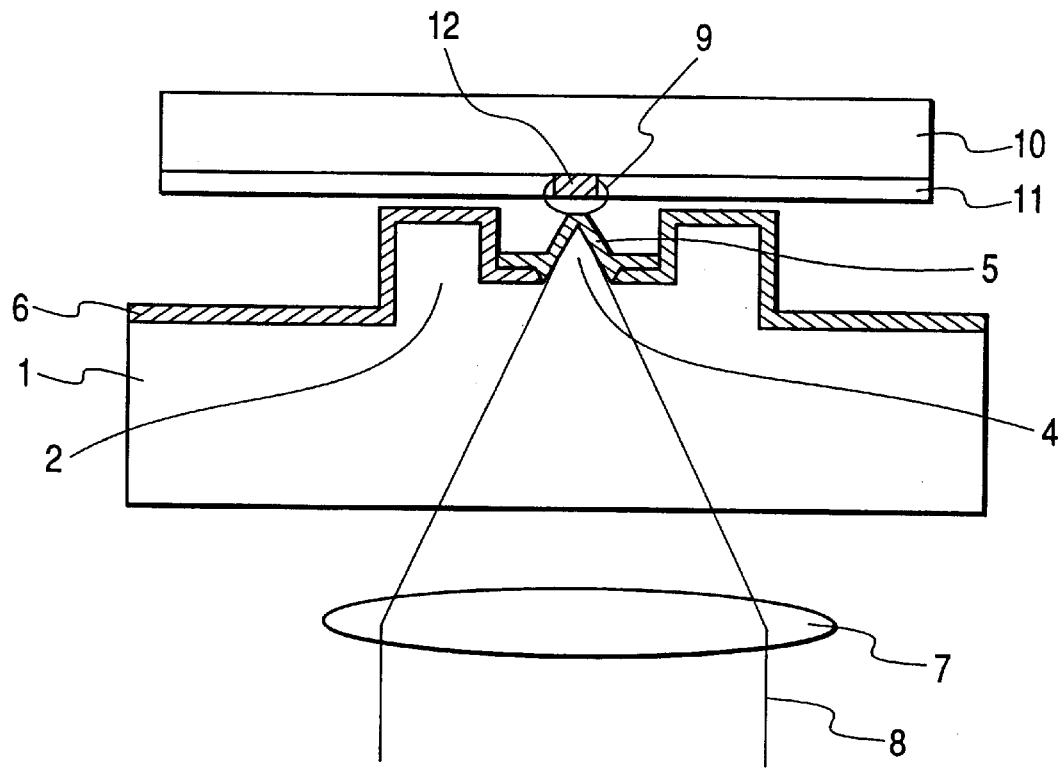
FIG. 8B is a cross-sectional view taken on a line G–G' in FIG. 8A.

FIG. 8 is a third preferred embodiment according to the present invention using a flying type slider. FIG. 8A is a perspective view of the near-field optical head of the present preferred embodiment. FIG. 8B is a cross-sectional view taken on a line G–G' in FIG. 8A. In FIG. 8A, on a slider 1 made of optically transparent material, pads 2 and 3 are provided for controlling the state of flying of the slider 1 and an information-recording medium 11. In the present preferred embodiment, three pads are provided on the bottom face of the slider 1. The pad 2, one of them, is divided into four parts and a pyramid-shaped probe 4 for exciting near-field light is provided at the center thereof. In the present preferred embodiment, the height of the four-divided small pads of the pad 2 is designed to be smaller than the height of the whole pad 2 and the height of the pad 3 from the bottom face of the slider 1, so that the height from the bottom face to the top face of the pad can be freely designed irrespective of the size of the probe 4 and hence a flying height of the slider 1 can be freely set. Further, the height of the four-divided small pads of the pad 2 is set slightly higher than the height of the probe 4, as is the case with a first preferred embodiment. Since the height of the small pad can be set according to the shape and the size of the probe 4 without taking into account the flying height of the slider 1, the degree of flexibility in manufacturing the probe 4 is increased.

Although a probe having a shape shown in FIG. 2A was described as an example in the above-mentioned preferred embodiments 2 and 3, the shapes of the sliders shown in the preferred embodiment 2 and 3 can be applied similarly to all other shapes of the probes shown in FIG. 2 to FIG. 6.

Figure 9A:
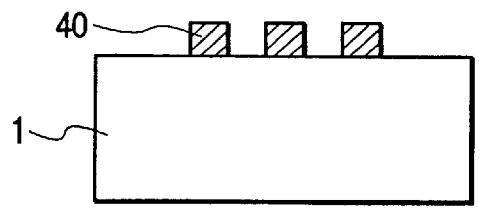
FIG. 9A to FIG. 9F show a manufacturing process of various types of near-field optical heads shown in FIG. 1 to FIG. 8.
Figure 9B:
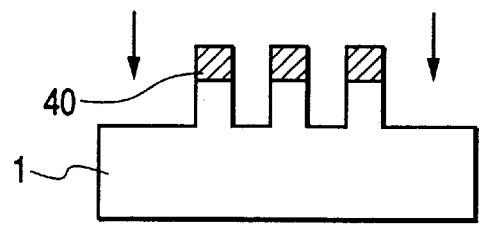
Figure 9C:
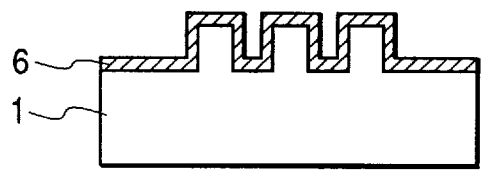
Figure 9D:
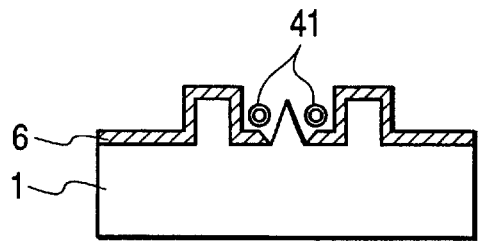
Figure 9E:
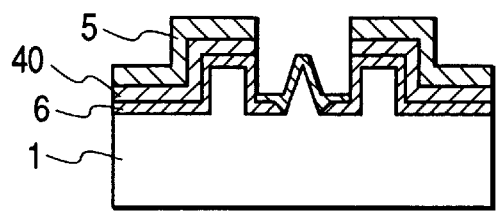
Figure 9F:
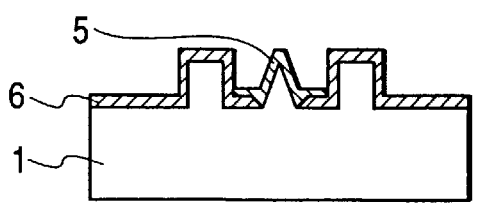
Figure 10:
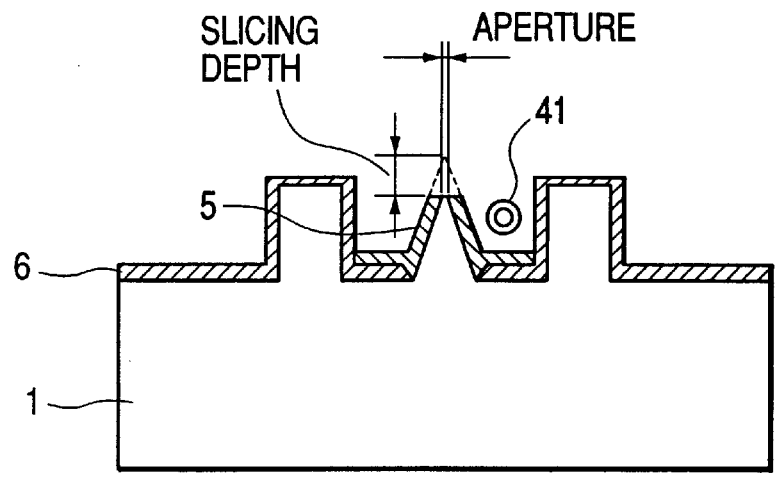
FIG. 10 shows the magnitude of an aperture at the top of the near-field optical head shown in FIG. 4, FIG. 5, and FIG. 6.

FIG. 9 and FIG. 10 show a process for manufacturing the near-field optical head shown in FIG. 1 to FIG. 8.

First, as shown in FIG. 9A, photo resist 40 is applied to a substrate 1 and is exposed to light and is developed and then only portions where pads 2 and 3 and a probe 4 are made are left as a mask. Next, as shown in FIG. 9B, a mask pattern formed in FIG. 9A is transferred to the substrate 1, for example, by dry etching using argon gas. Next, as shown in FIG. 9C, the photo resist 40 is removed and then a protection film 6 for protecting the bottom face of the slider and the surface of the pad is formed by a sputtering method. Next, as shown in FIG. 9D, the probe is shaped into a predetermined shape by etching using a focused ion beam (hereinafter referred to as FIB) 41. In the case of using a gallium ion for the FIB, an acceleration voltage is made about several tens kV and a beam current is made about several tens pA. The beam size at the focusing position of the FIB 41 is about several tens nm. This is a sufficient resolution for manufacturing the probe according to the present invention. In the shaping process using the FIB, while a sample to be shaped is being irradiated with the ion beams, a secondary electron image is taken and while the secondary electron image is being looked, the ion-irradiated position can be controlled freely, so that the probe can be flexibly shaped with ease in a short time. In the shaping process of the probe, the probe is etched by irradiating the center projection thereof to be shaped with the ion beams from one side of the substrate 1 through a gap between the pads 2, so that the center projection is shaped from a rectangular solid into a triangular prism. When the probe 13 or 23 is made, this is the end of the shaping process. When the probe is shaped into a pyramid like the probe 4, after the above-mentioned process is ended, the substrate 1 is turned 90 degrees around an axis parallel to the center axis of the probe and then the probe is etched again by irradiating the probe with the ion beams from the direction at 90 degrees to the direction of the ion beams when the probe is etched first, through a gap between the pads 2, whereby the probe is finally shaped into a pyramid. The total shaping time is about ten minutes, depending on the material of the substrate 1. As described above, the height of the probe is made nearly equal to and slightly smaller than the height of the pad by manufacturing the probe by applying the FIB from the side of the substrate 1. After the probe is shaped by the FIB, as shown in FIG. 9E, the pad and the other bottom face of the slider are covered by the photo resist 40 and only the probe is exposed and then the metallic thin film 5 is formed on the probe. Finally, the metal formed on the pad and the other bottom face of the slider is removed by a lift-off method to make the near-field optical head shown in FIG. 9F.

Further, in the case of manufacturing the probe with an aperture shown in FIG. 4 to FIG. 6, as shown in FIG. 10, the probe of a finished state shown in FIG. 9F is irradiated with the FIB 41 again from the side of the substrate to cut away the top thereof. The size of the aperture can be freely changed by controlling a slicing depth shown in FIG. 10. Furthermore, according to the present method, as shown in FIG. 10, the top of the cut probe is flat and the height thereof does not exceed the height of the pad. Accordingly, the top of the probe does not collide with and break the recording medium 11, which can improve reliability. Still further, in the case of manufacturing the probe of specific shapes shown in FIG. 6B and FIG. 6C, when the probe is shaped by the FIB as shown in FIG. 9D, the probe is etched by controlling the position of the ion beams according to the shape to be intended. It is the main effect of the manufacturing method using the FIB that the probe can be shaped into a desired shape in a short time as described above.

Figure 11:
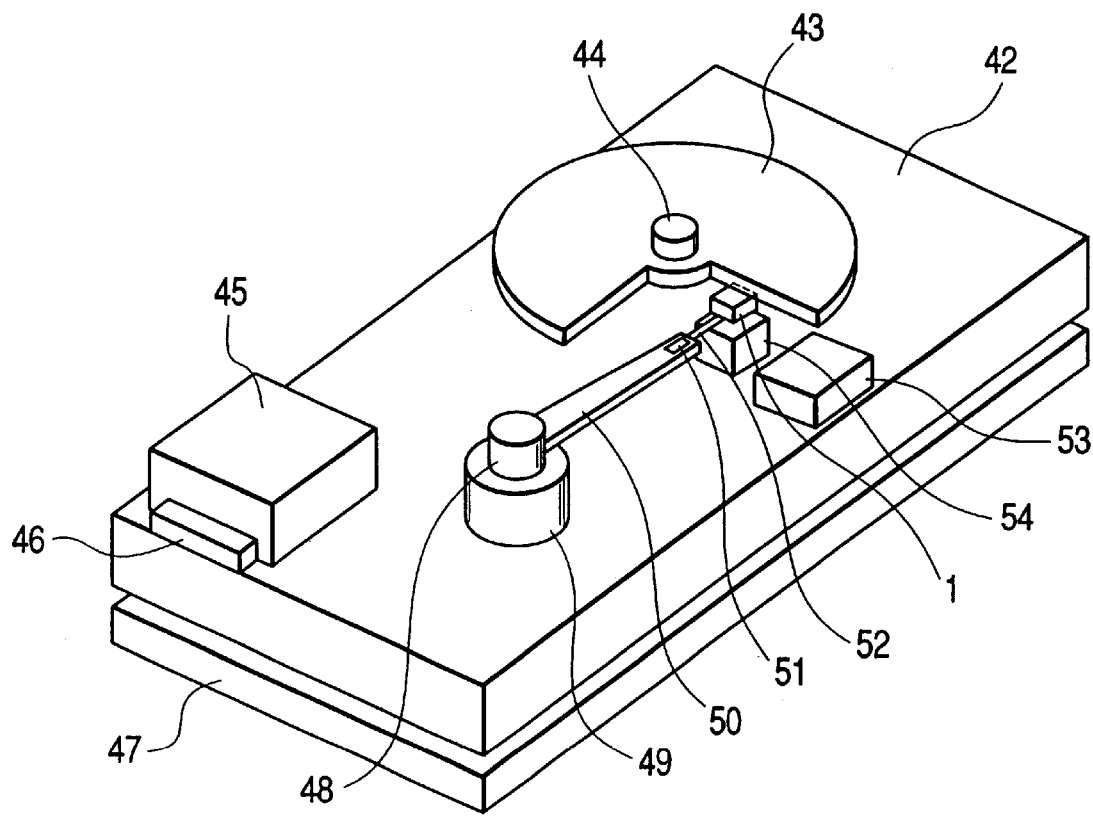
FIG. 11 is a perspective view showing a recording medium of an optical recording/readout system to which a near-field optical head according to the present invention is applied with parts partially broken away.

FIG. 11 is a perspective view of an optical recording/readout system to which the near-field optical head according to the present invention is applied. A disc 43 comprising the recording medium substrate 10 and the recording medium film 11 is fixed to a spindle 44 joined to a spindle motor fixed to a base 42 and is rotated relatively to the slider 1 on which any of the near-field optical heads shown in FIG. 2 to FIG. 8. An actuator 49 for positioning the slider 1 is also fixed to the base 42 and the movable part 48 thereof is provided with an arm 50 and a suspension 52. The movable part 58 is rotated around a center axis thereof to move the slider 1 fixed to the top of the suspension 52 in the radial direction of the disc 43. Further, in the case of using a disc with a small tracking pitch, an actuator 51 capable of positioning the slider 1 further finely than the actuator 49 is fixed to the top of the arm 50. A connector 46 is joined to an interface 45 fixed to the base 42 and an electric power supply for driving the present system, and a recording/readout instruction, an input of recording information and an output of readout information to the system are performed through the cable joined to the connector 46. A supply of laser light to the near-field optical head, a detection of recording information, a detection of a position error of the slider from the track, and a detection of a position error of the objective lens and the slider are performed by using an optical head 53 fixed to the base 42, which is described in detail with reference to FIG. 12. A movable part 54 mounted with a Garvano mirror, an objective lens, and an actuator for moving the objective lens is disposed just under the slider 1. The movable part 54 is moved in the radial direction of the disc 43 by the actuator for moving the whole movable part in response to the slider 1.

Figure 12:
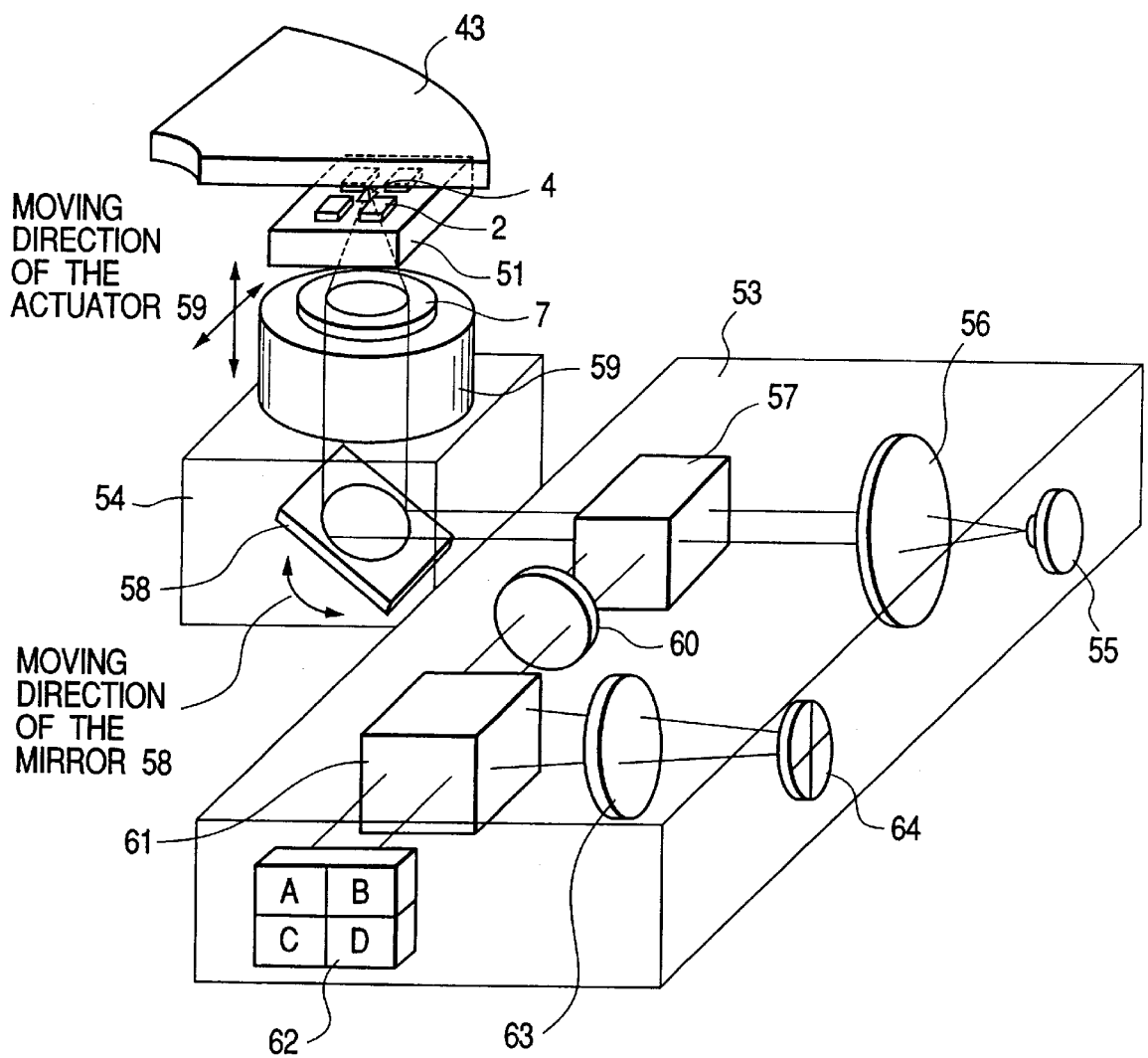
FIG. 12 shows in detail an optical head used in FIG. 11.

Next, the operation of the optical head 53 and the movable part 54 will be described in detail with reference to FIG. 12. The laser light excited by a semiconductor laser 55 is converted into the collimated beam by a collimate lens 56 and then is passed through a beam splitter 57 and has the direction thereof changed by the Garvano mirror. The laser light having the direction changed by the Garvano mirror is focused on the probe 4 by the objective lens 7 to excite the near-field light, whereby the operation of recording/readout of information on/from the recording medium formed on the disc 43 is performed. Although the probe 4 (and the slider 1 mounted with it) shown in FIG. 2A will be described as an example of the probe, the following content is absolutely the same for any probe shown in FIG. 2 to FIG. 8. The laser light having intensity changed by the information of the recording medium is passed through the objective lens 7 and has the direction thereof changed again by the Garvano mirror 58 and is reflected by the beam splitter 57 and is guided to a detection unit. The detection unit detects a readout signal, the position error between the focus of the laser light focused by the objective lens 7 and the probe 4 in the lateral direction and in the transversal direction. The position error between the focus of the laser light and the probe 4 in the transversal direction is detected by focusing the laser light, which is focused by a lens 60 and is divided by a beam splitter 61, on a four-fold-divided photodetector 64 by a lens for focusing light only in one direction such as cylindrical lens 63 and by using a focusing error detection method called an astigmatic aberration detection method. The position error between the focus of the laser light and the probe 4 in the transversal direction is detected by a four-fold-divided photodetector 62 as follows. If the focus of the laser light is deviated in the radial direction of the probe 4 and the disc 43, the sum signal of the detector A and the detector C does not balance with the sum signal of the detector B and the detector D. Therefore, the position error can be detected by the difference in the sum signals. On the other hand, if the focus of the laser light is deviated in the peripheral direction of the probe 4 and the disc 43, the sum signal of the detector A and the detector B does not balance with the sum signal of the detector C and the detector D. Therefore, the position error can be detected by the difference in the sum signals. The objective lens 7 is always focused on the probe 4 to excite the near-field light effectively with the use of these position error signals, for example, by correcting the position error between the focus of the laser light and the probe 4 in the lateral direction and in the peripheral direction of the disc 43 by a two-dimensional actuator 59 provided around the objective lens 7, and by correcting the position error between the focus of the laser light and the probe 4 in the radial direction of the disc 43 by an actuator for moving the inclination of a mirror 58 provided on the Garvano mirror 58. Finally, if the recording medium of phase change type or a read-only ROM media is employed as the recording medium formed on the disc, the recorded information is read out by using the intensity of the sum signals of all detectors of the four-fold-divided photodetectors 62 and 64.

Figure 13:
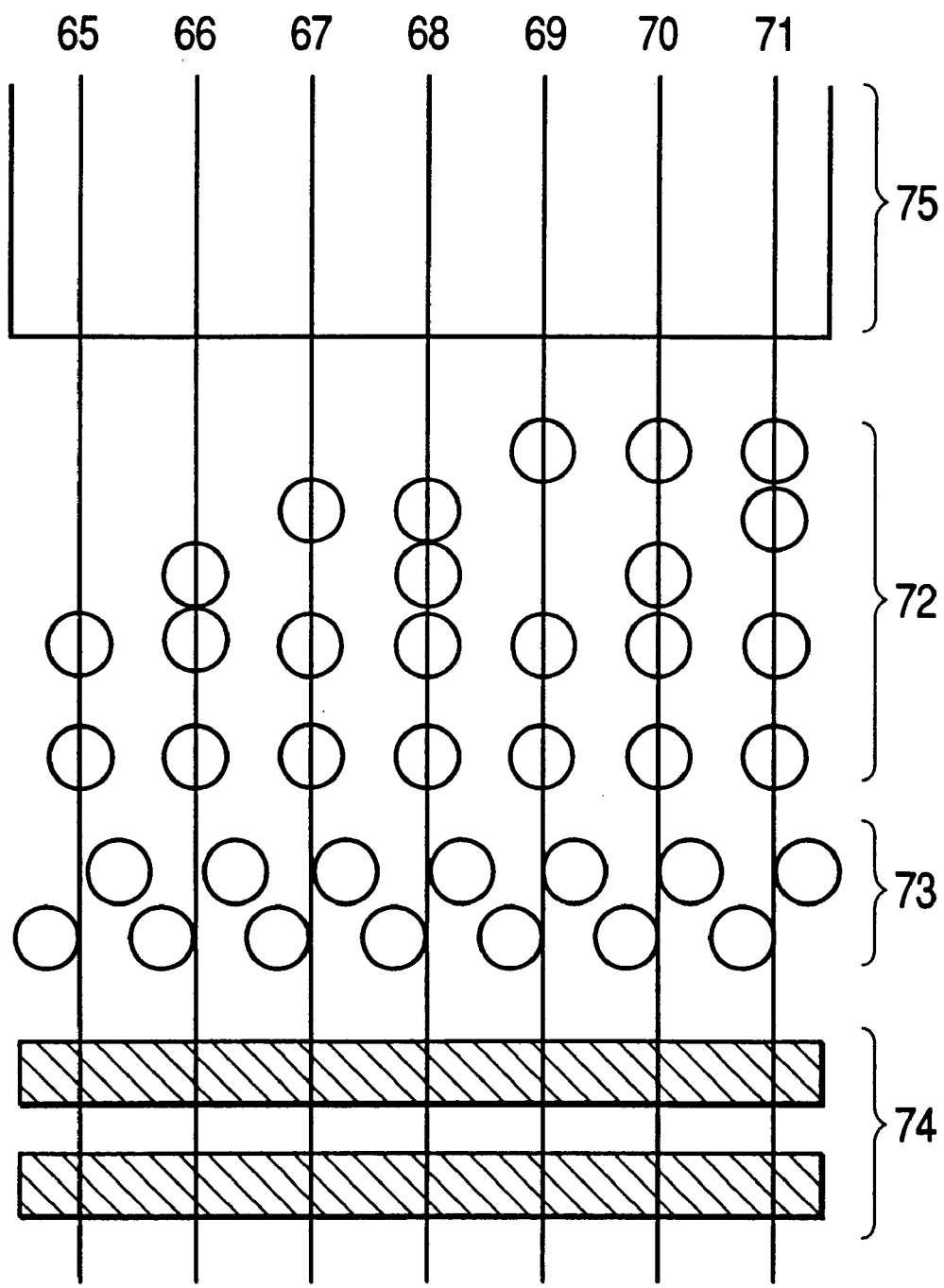
FIG. 13 shows a servo operation in an optical recording/readout system according to the present invention.

Next, a positioning servo technique according to the present invention will be described with reference to FIG. 13. In FIG. 13, numerals 65 to 71 designate seven recording tracks among many recording tracks made on the disc. A numeral 72 designates a group of address marks for identifying a track number, which are different at each track and make it possible to detect the track on which the probe 4 is positioned. Each track is provided with a wobble mark 73 and a clock mark 74. When the information is recorded or read out, the probe 4 is moved upward from below in FIG. 13. The probe 4 passes above the clock mark 74 to make a clock and then passes above the wobble mark 73. If the probe 4 is deviated from the center of the track, the signals from two consecutive wobbles are unbalanced and the difference between the signals is made a tracking error signal. The actuator 49 (also actuator 51 if provided ) is driven by the tracking error signal in response to the tracking error signal to position the probe 4 at the center of the track. Since the objective lens 7 is moved, as described above, in such a way that the laser light is always focused on the probe 4, the focus of the laser light is also servo-operated in response to the servo operation described above. The probe 4 passes above the wobble mark 73 and then passes above the address mark 72 and enters a recording part 75 for recording the information and records or reads out the information.

Next, a seek operation for moving the probe 4 to an objective track will be described. In the seek operation, a system controller 47 in FIG. 11 compares the position which the information designated by an outside controlling unit is recorded on or read out from with the actual position of the probe 4 detected by the four-fold-divided photodetectors 62 and 64. The positioning actuator 49 (also actuator 51 if provided) is driven on the basis of the comparing results to position the probe 4 at a specified track on the disc 43. Here, the objective lens 7 is servo-operated by the actuator 59 such that the focusing position of the laser light and the position of the probe 4 are not deviated in the lateral direction, and in the transversal plane and in the peripheral direction of the disc 43, and is moved in response to the slider 1 mounted with the prove 4 by the actuator for moving the whole movable part 54 in the radial direction of the disc 43, which is not explicitly illustrated in FIG. 12. Since the slider 1 and the movable part 54 are extremely lightweight, the present optical recording/readout system can shorten the time required for the seek operation to the same level as a conventional hard disc drive.

FIG. 14 shows the other preferred embodiment according to the present invention. FIG. 14A is an example in which an objective lens 76 is integrated with the slider 1. In addition to a conventional curved lens, a lens to which a diffraction grating such as a Fresno lens is applied can be used as the objective lens 76. FIG. 14B is an example in which, in addition to the objective lens 78, a semiconductor laser 77 and a photodiode 79 are mounted on the slider 1. In this case, if a plane lens using the diffraction grating such as the Fresno lens is used as the objective lens 78 and a surface light-emitting laser is used as the semiconductor laser, the size of the present system can be extremely reduced. An example shown in FIG. 14B eliminates the need for aligning the focus of the laser light to the probe 4 and hence does not need the optical head parts 53 and 54 shown in FIG. 11 and FIG. 12. With this constitution, the system becomes absolutely the same in the constitution as the conventional hard disc drive and hence becomes an extremely low-profile compact optical recording/readout system.

FIG. 15 shows further the other preferred embodiment according to the present invention. In the preferred embodiments described above, the information is detected by the reflection light from the probe, but FIG. 15 shows an example in which the information is detected by transmission light from the disc. The readout signal from the information 12 is focused on a detector 82 by an objective lens 80. In the case of using a magneto-optical recording medium as an optical recording medium 11, an element 81 for controlling the polarization direction of the transmission light is inserted before the detector 82 to detect the information.

Figure 16A:
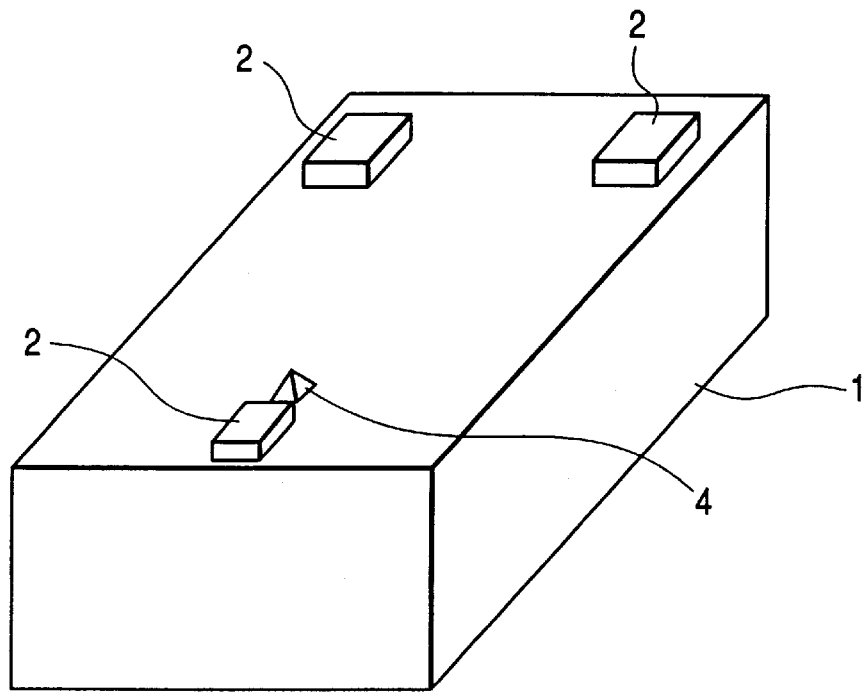
FIG. 16A shows a seventh preferred embodiment of a slider according to the present invention.
Figure 16B:
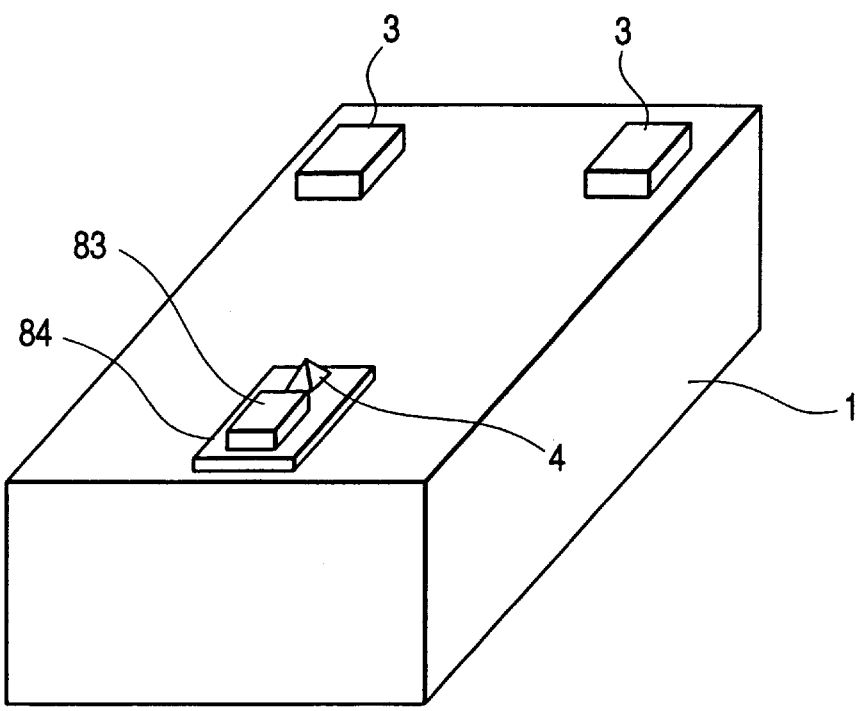
FIG. 16B shows the eighth preferred embodiment of a slider according to the present invention.

The preferred embodiments have been hitherto described in which three pads are provided on the bottom face of the slider 1 and the pad 2, one of them, is divided into four parts and the pyramid-shaped probe 4 for exciting the near-field light is provided at the center thereof, but as shown in FIG. 16, the constitution can be simplified further. In FIG. 16A, three pads 2 are provided on the bottom face of the slider 1. The pyramid-shaped probe 4 for exciting the near-field light is provided near the inside of one pad among them. Any shape of the probe shown in FIG. 2 to FIG. 6 can be used as the probe 4. Further, although the flying type slider corresponding to FIG. 1 is shown in FIG. 16, the contact type slider shown in FIG. 17 can be used. In FIG. 16B, as is the case of FIG. 8, the pad 83 and the probe 4 for exciting near-field light are placed on a common base 84 and the pad 83 is near to the probe 4. The height of the pad 83 is designed to be smaller than the height of the other pads 3 from the bottom face of the slider 1. In this preferred embodiment, the slider 1 has a simple structure and hence can be easily manufactured.

As described above, the present invention can provide a near-field optical head, which can increase the relative speed of the recording medium to the optical head for recording/reading-out information to increase the information data transfer rate and eliminate the need for an additional unit for detecting the gap between the recording medium and the optical head and is reduced in size and weight and is simply constituted, and an optical recording/readout system using the near-field optical head.

What is claimed is:

1. A near-field optical head comprising:
   an optically transparent slider which moves relatively to an information-recording medium while keeping contact with or a nearly constant gap to the information-recording medium;
   a column-shaped pad mounted on the surface of the slider opposite to the information-recording medium and for controlling the state of contact or flying of the slider with or to the information-recording medium; and a pyramid-shape probe for exciting near-field light having a small spot size, wherein the pad is near to the probe.

2. A near-field optical head according to claim 1, wherein the height of the probe is smaller than the height of the pad.

3. A near-field optical head according to claim 2, wherein an optically opaque thin film is formed on the probe.

4. A near-field optical head according to claim 3, wherein the optically opaque thin film is metallic.

5. A near-field optical head according to claim 4, wherein the pad is arranged in such a way to surround the probe.

6. A near-field optical head according to claim 5, wherein the pad is divided into at least a plurality of parts and the pad and the probe are arranged in such a way that the probe can be seen through a gap between the divided parts.

7. A near-field optical head according to claim 5, wherein the probe has at the top thereof an aperture in which the constituent of the probe is exposed and wherein the aperture and the surface of the metallic thin film are nearly on the same plane.

8. A method for manufacturing a near-field optical head according to claim 4, the method comprising a step of shaving the probe into a pyramidal structure by etching the probe by irradiating the probe with particle beams.

9. A method for manufacturing a near-field optical head according to claim 4, the method comprising a step of forming the aperture by etching the probe by irradiating the thin film with particle beams.

10. An optical recording/readout system, comprising: a near-field optical head according to claim 4; a light source for supplying illumination light to the near-field optical head;

an optical recording medium; and a detection system for detecting a modulated signal of the near-field light excited by the near-field optical head by the recording medium.

11. An optical recording/readout system according to claim 10, further comprising:

a focusing system for focusing illumination light on the probe;

detection means for detecting a position error between the focusing position of the illumination light focused by the focusing system and the position of the probe; and a motion mechanism for correcting the relative position of the focusing system to the probe.

12. An optical recording/readout system according to claim 11, wherein the motion mechanism for correcting the relative position of the focusing system to the probe focusing system and the focusing system are separated from the other constituents constituting the optical recording/readout system and the focusing system is mounted on a motion mechanism for making the focusing system access a predetermined position.

13. A near-field optical head comprising:

an optical transparent slider moving relatively to an information recording medium;

a pad for controlling a gap between the information recording medium and the slider; and a pyramid-shaped probe for exciting near-field light, wherein the pad and the probe are mounted on the surface of the slider opposite to the information recording medium and the pad is near to the probe.

14. A near-field optical head according to claim 13, wherein the height of the probe is smaller than the height of the pad.

15. A near-field optical head according to claim 14, wherein an optical opaque thin film is formed on the probe.

16. A near-field optical head according to claim 15, wherein an optical opaque thin film is metallic.

17. A near-field optical head according to claim 16, wherein the pad is arranged in such a way as to surround the probe.

18. A near-field optical head according to claim 17, wherein the pad is divided into at least a plurality of parts and the pad and the probe are arranged in such a way that the probe can be seen through a gap between the divided parts.

19. A near-field optical head according to claim 17, wherein the probe has at the top thereof an aperture in which the constituent of the probe is exposed and wherein the aperture and the surface of the metallic thin film are nearly on the same plane.

20. A near-field optical head comprising:

an optically transparent slider which moves relatively to an information-recording medium;

a plurality of column-shaped pads for controlling a gap between the slider and the information recording medium; and a pyramid-shaped probe for exciting near-field light having a small spot size, wherein the pad and the probe are mounted on the surface of the slider opposite to the information recording medium in such a way that the probe is positioned between the pads.

21. A near-field optical head comprising:

an optically transparent slider which moves relatively to an information-recording medium;

a pad for controlling a gap between the slider and the information-recording medium;

a lens for focusing laser light;

a pyramid-shaped probe for exciting near-field light by laser light focused by the lens;

a metallic thin film with which the probe is coated; and an anti-wearing thin film formed on the surface of the pad opposite to the information-recording medium, wherein the pad is divided into four parts and the probe is arranged at the center of the divided parts.

22. An optical recording/readout system comprising:

a near-field optical head including:

an optically transparent slider which moves relatively to an information-recording medium while keeping contact with or a nearly constant gap to the information-recording medium;

a column-shaped pad mounted on the surface of the slider opposite to the information-recording medium and for controlling the state of contact or flying of the slider with or to the information-recording medium; and a pyramid-shaped probe for exciting near-field light having a small spot size;

a light source for supplying illumination light to the near-field optical head;

a detection system for detecting a modulated signal of the near-field light excited by the near-field optical head by the recording medium, wherein the pad is near to the probe and the height of the probe is smaller than the height of the pad.

23. An optical recording/readout system comprising:

a support mechanism;

a probe for exciting near-field light at the top thereof and mounted on the top of the support mechanism;

a rotary information-recording medium; and an optical mechanism including a lens for applying the near-field light to the probe, wherein the probe is separated from the surface of the rotary information-recording medium and the optical mechanism is separated from the probe and the support mechanism thereof.

24. An optical recording/readout system comprising:

a probe;

support means for supporting the probe;

a first movable mechanism for moving the probe and the support means;

an optical system separated from the probe and the support means and including a lens for applying light to the probe; and a second movable mechanism different from the first movable mechanism for controlling the optical system.

\* \* \* \* \*